US012190207B2

(12) United States Patent
De Paepe et al.

(10) Patent No.: US 12,190,207 B2
(45) Date of Patent: Jan. 7, 2025

(54) SYSTEM FOR PREPARING MACHINE LEARNING TRAINING DATA FOR USE IN EVALUATION OF TERM DEFINITION QUALITY

(71) Applicant: Collibra Belgium BV, Brussels (BE)

(72) Inventors: Gretel De Paepe, Watermaal-Bosvoorde (BE); Michael Tandecki, Vilvoorde (BE)

(73) Assignee: Collibra Belgium BV, Brussels (BE)

( * ) Notice: Subject to any disclaimer, the term of this patent is extended or adjusted under 35 U.S.C. 154(b) by 97 days.

(21) Appl. No.: 17/130,869

(22) Filed: Dec. 22, 2020

(65) Prior Publication Data

US 2022/0198323 A1   Jun. 23, 2022

(51) Int. Cl.
*G06N 20/00*   (2019.01)
*G06F 18/214*   (2023.01)

(52) U.S. Cl.
CPC .......... *G06N 20/00* (2019.01); *G06F 18/214* (2023.01)

(58) Field of Classification Search
CPC ........ G06N 20/00; G06N 3/04; G06K 9/6256; G06F 16/35; G06F 40/242; G06F 40/284; G06F 40/40; G06Q 10/063
See application file for complete search history.

(56) References Cited

U.S. PATENT DOCUMENTS

| | | | |
|---|---|---|---|
| 10,929,392 B1 * | 2/2021 | Cheng .................. | G06F 16/242 |
| 2007/0199017 A1 * | 8/2007 | Cozen .................... | H04N 21/84 |
| | | | 725/35 |
| 2012/0150848 A1 * | 6/2012 | O'Neill ................ | G06F 40/242 |
| | | | 707/723 |
| 2016/0170938 A1 * | 6/2016 | Allen ..................... | G06F 40/30 |
| | | | 704/9 |
| 2019/0311301 A1 * | 10/2019 | Pyati ..................... | G06F 16/901 |
| 2019/0371303 A1 * | 12/2019 | Siva Kumaran ....... | G06N 20/00 |
| 2020/0134481 A1 * | 4/2020 | Williams .............. | G06F 40/289 |

(Continued)

OTHER PUBLICATIONS

Rassbach, L., Pincock, T., & Mingus, B. (2007). Exploring the feasibility of automatically rating online article quality. In Proceedings of the 2007 International Wikimedia Conference (WikiMania), Taipei, Taiwan (vol. 66). (Year: 2007).*

(Continued)

*Primary Examiner* — Bhavesh M Mehta
*Assistant Examiner* — Philip H Lam
(74) *Attorney, Agent, or Firm* — Perkins Coie LLP

(57) ABSTRACT

A system for preparing machine learning training data for use in evaluation of term definition quality. The system can include a server having at least one server processor and at least one server memory for storing a plurality of terms with corresponding definitions, and a plurality of client devices each having at least one client memory device and at least one client processor. The client processor programmed to receive at least one of the plurality of terms and its corresponding definition from the server, display the term and its corresponding definition, and receive an indication of whether the definition satisfies one or more definition quality guidelines. The server memory includes instructions for causing the at least one server processor to receive the indications from the plurality of client devices and label each definition as satisfying each of the definition quality guidelines or not based on the received indications.

19 Claims, 14 Drawing Sheets

(56) References Cited

U.S. PATENT DOCUMENTS

| | | | | |
|---|---|---|---|---|
| 2020/0143913 | A1* | 5/2020 | Castine | G06F 16/35 |
| 2020/0394267 | A1* | 12/2020 | Mwarabu | G06N 20/00 |
| 2021/0263959 | A1* | 8/2021 | Bastide | H04L 51/216 |
| 2021/0397792 | A1* | 12/2021 | Atallah | G06F 40/295 |
| 2022/0050967 | A1* | 2/2022 | Veyseh | G06F 40/289 |
| 2022/0058342 | A1* | 2/2022 | Fan | G06N 20/00 |
| 2022/0122690 | A1* | 4/2022 | Liu | A61K 39/0011 |
| 2022/0164531 | A1* | 5/2022 | He | G06F 40/169 |

OTHER PUBLICATIONS

Gudivada, V., Apon, A., & Ding, J. (2017). Data quality considerations for big data and machine learning: Going beyond data cleaning and transformations. International Journal on Advances in Software, 10(1), 1-20. (Year: 2017).*

Khatri, V., & Brown, C. V. (2010). Designing data governance. Communications of the ACM, 53(1), 148-152. (Year: 2010).*

Gómez-Pérez, A. (2001). Evaluation of ontologies. International Journal of intelligent systems, 16(3), 391-409. (Year: 2001).*

International Search Report and Written Opinion mailed Feb. 23, 2022 for International Patent Application No. PCT/EP221/085183, 13 pages.

Flekova, Lucie, et al., "What Makes a Good Biography? Multidimensional Quality Analysis Based on Wikipedia Article Feedback Data", International World Wide Web Conference (IW3C2), Seoul, Korea, Apr. 7, 2014, pp. 855-866.

Rassbach, Laura, et al., "Exploring the Feasability of Automatically Rating Online Article Quality", Proceedings of the 2007 Wikimania Conference (Online); Retrieved from the Internet: URL:https://upload.wikimedia.org/wikipedia/wikimania2007/d/d3/RassbackPincockMingus07.pdf, Aug. 3-5, 2007, 5 pages.

* cited by examiner

Step1: Tokenize

| A | cat | is | a | feline |

— 402

Step2: Part of Speech tagging

| A | cat | is | a | feline |
|---|-----|-----|-----|--------|
| DT | NN | VBZ | DT | NN |

— 404

DT: Determiner

NN: Noun, singular or mass

VBZ: Verb, 3rd person singular present

Step3: Replace by numeric values

| A | cat | is | a | feline |
|---|-----|-----|-----|--------|
| DT | NN | VBZ | DT | NN |
| 0.12 | 0.11 | 0.08 | 0.12 | 0.11 |

— 406

DT: 0.12

NN: 0.11

VBZ: 0.08

Step4: Padding so all defs end up with same length (e.g. here 10)

— 408

| A | cat | is | a | feline | | | | | |
|---|-----|-----|-----|--------|---|---|---|---|---|
| DT | NN | VBZ | DT | NN | | | | | |
| DT | NN | VBZ | DT | NN | | | | | |
| 0.12 | 0.11 | 0.08 | 0.12 | 0.11 | | | | | |
| 0.12 | 0.11 | 0.08 | 0.12 | 0.11 | 0.45 | 0.45 | 0.45 | 0.45 | 0.45 |

Step1: BOW POS

| NN | DT | VBZ | JJ | ... |
|----|----|----|----|-----|
| 2  | 2  | 1  | 0  | ... |

502

Step2: Calculate percent of total

| NN  | DT  | VBZ | JJ | ... | Total |
|-----|-----|-----|----|-----|-------|
| 2   | 2   | 1   | 0  | ... | 5     |
| 0.4 | 0.4 | 0.2 | 0  | ... |       |

Definition Quality

Use machine learning to test the quality of definitions.

Use the sidepanel to refresh your memory on the guidelines.

Input your term here: — 802 cat

Input your definition here: — 804 a small domesticated carnivorous mammal with soft fur, a short snout, and retractable claws.

806

| | Score | Quality | Hist |
|---|---|---|---|
| Structure | 0.6887 | ● | |
| Circular | 1.0000 | ● | |
| Examples | 1 | ● | — 808 |
| Intensional | 0.9918 | ● | |
| Conciseness | 0.7500 | ● | |
| Negative | 1 | ● | |
| Subdefinitions | 1.0000 | ● | |
| Overall | 0.???? | ● | |

— 810

Provide feedback

Select the guidelines for which you disagree with our evaluation:

Choose an option

Send Feedback

*FIG. 8*

Definition Quality — 800

Use machine learning to test the quality of definitions.

Use the sidepanel to refresh your memory on the guidelines.

Input your term here: — 802 cat

Input your definition here: — 804 a cat is a feline

806

| | Score | Quality | Hint |
|---|---|---|---|
| Structure | 0.5697 | ● | Try using the following struc... |
| Circular | 0.0029 | ● | Avoid defining the definition... |
| Examples | 1 | ● | |
| Intensional | 0.9986 | ● | |
| Conciseness | 0 | ● | Avoid definitions which are e... |
| Negative | 1 | ● | — 812 |
| Subdefinitions | 0.9997 | ● | |
| Overall | 0.6638 | ● | |

— 810     — 808

Provide feedback

Select the guidelines for which you disagree with our evaluation:

Choose an option ▾
— 814

Send Feedback

*FIG. 9*

|   | A | B | C | D |
|---|---|---|---|---|
| 1 | index | term | definition | label |
| 2 | 0 | Reconciliatio | A procedure | good |
| 3 | 1 | Price | A price is the | good |
| 4 | 2 | Supplier | A person or c | good |
| 5 | 3 | Purchase Ord | A purchase o | good |
| 6 | 4 | Expense | Expense is th | good |
| 7 | 5 | Purchase | Acquisition o | good |
| 8 | 6 | Counterparty | In any financ | good |
| 9 | 7 | Credit | An entry on t | good |
| 10 | 8 | Budget | A plan to shc | good |
| 11 | 9 | Employee | Any person v | good |
| 12 | 10 | Services | A type of ecc | good |
| 13 | 11 | Value at Risk | Value at risk | good |
| 14 | 12 | Counterparty | A legal entit | good |
| 15 | 13 | Customer Lif | Customer lif | good |
| 16 | 14 | Reconciliatio | Ensures that | good |
| 17 | 15 | Contract | A contract is | good |
| 18 | 16 | Inventory | A complete l | good |
| 19 | 17 | Employee | An individual | good |
| 20 | 18 | Employee | An employee | good |
| 21 | 19 | Price | The price of | good |
| 22 | 20 | Credit | An accountin | good |
| 23 | 21 | Goods Recei | A means of r | good |
| 24 | 22 | Customer Lif | The total gai | good |
| 25 | 23 | Buyer | a purchasing | good |
| 26 | 24 | Value at Risk | Value at risk | good |
| 27 | 25 | Product | A product is | good |
| 28 | 26 | Purchase | The purchase | good |
| 29 | 27 | Country | A country is | good |
| 30 | 28 | Product | A product is | good |
| 31 | 29 | Inventory | An itemized | good |
| 32 | 30 | Buyer | A buyer is ar | good |
| 33 | 31 | Contract | Every agreen | good |
| 34 | 32 | Customer | A Party(ies) i | good |
| 35 | 33 | Price | Price, the am | good |

*FIG. 11*

SYSTEM FOR PREPARING MACHINE LEARNING TRAINING DATA FOR USE IN EVALUATION OF TERM DEFINITION QUALITY

TECHNICAL FIELD

This patent application is directed to data governance, and more specifically, to assessing the quality of definitions used in business assets.

BACKGROUND

Good definitions are central to the effort of data governance, and creating and approving them is one of the major tasks for data governance teams. A good definition, once developed, provides a clear picture of what a business asset is (and, by extension, what it is not). A good definition precludes the kinds of contradictions and ambiguities that create problems for the interpretation and organization of data, especially large amounts of data across numerous databases.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 4 is a graphic illustration of representative steps for deriving a feature input according to some implementations of the present technology;

FIG. 5 is a graphic illustration of representative steps for deriving another feature input according to some implementations of the present technology;

FIG. 8 is a representative graphical user interface for manually inputting terms and definitions for quality assessment according to some implementations of the present technology;

FIG. 9 is the graphical user interface shown in FIG. 8 illustrating representative quality scores for another definition;

FIG. 11 is a table including representative machine learning training data according to some implementations of the present technology;

Figure 1:
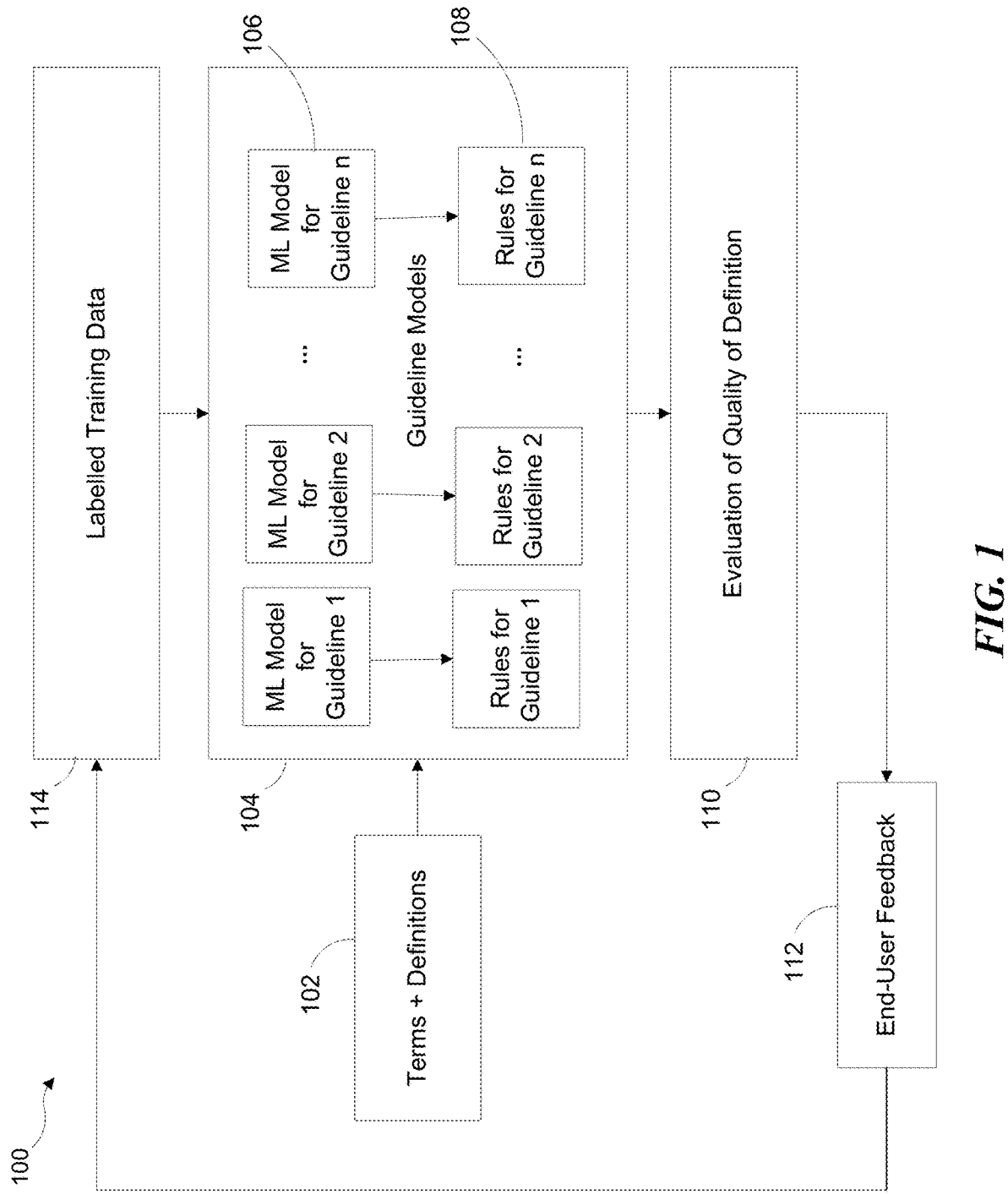
FIG. 1 is a flow diagram illustrating a system for automatically assessing the quality of definitions for terms stored in an enterprise data management system according to some implementations of the present technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for automatically assessing the quality of definitions. In some implementations an enterprise data management system can include definition quality assessment capabilities for automatically assessing the quality of definitions for terms stored in the enterprise data management system. Also disclosed herein are methods and systems for preparing machine learning training data for use in evaluation of term definition quality. The disclosed technology can facilitate creating and selecting good definitions to help prevent the kinds of contradictions and ambiguities that create problems for the interpretation and organization of data. In some implementations the disclosed technology can automatically select the best definition when multiple definitions exist for a single term.

FIG. 1 is a high-level flow diagram illustrating a system 100 for automatically assessing the quality of definitions for terms stored in an enterprise data management system according to some implementations of the present technology. Terms and definitions 102, which can be stored in the enterprise data management system, are fed into various guideline models 104. For example, in some embodiments, the guidelines can evaluate structure, conciseness, circularity, and understandability, to name a few. Each guideline model 104 can comprise a machine learning model 106 and/or a corresponding set of rules 108.

Each guideline model 104 provides a corresponding score, all of which can be combined together to provide an overall evaluation of the quality of each definition 110. Individual guideline quality scores as well as the overall score for a particular definition can be provided to an end-user in order to inform the user and to facilitate receiving feedback 112. The feedback 112 can comprise an indication as to whether the user agrees or disagrees with individual guideline scores and/or the overall score. The end-user feedback 112 can be incorporated into or otherwise used to modify the labelled training data 114 used to train each machine learning guideline model.

Figure 2:
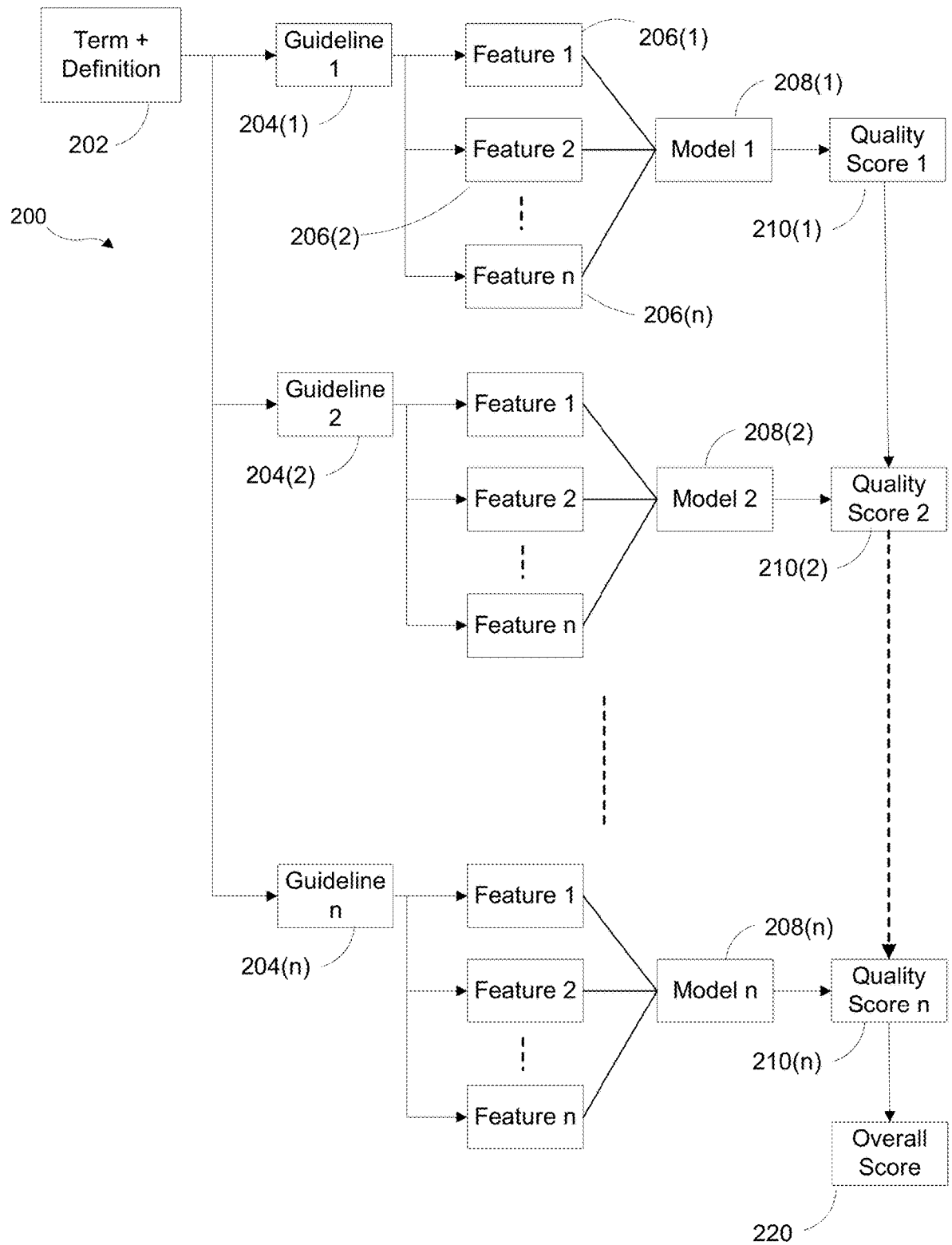
FIG. 2 is a flow diagram illustrating a system for assessing the quality of definitions based on definition guidelines according to some implementations of the present technology.

FIG. 2 is a flow diagram illustrating a system 200 for assessing the quality of definitions similar to that shown in FIG. 1. The system 200 is configured to receive a term and a corresponding definition 202. The system 200 assess the quality of the definition, including for each of a plurality of quantifiable definition guidelines 204(1)-204(n). The definition is evaluated for each guideline 204(1)-204(n) by deriving one or more feature inputs 206(1)-206(n) based on at least the definition. In some embodiments, the feature input is derived using both the definition and the term itself. The feature inputs 206(1)-206(n) are fed into model 208(1)-208(n) corresponding to the definition guideline 204(1)-204(n). In some embodiments, each model 208(1)-208(n) comprises a machine learning model and/or a set of rules. The models 208(1)-208(n) each provide a quality score 210(1)-210(n) for each corresponding guideline 204(1)-204(n). An overall quality score 220 is calculated based on the quality score 210(1)-210(n) for each of the plurality of definition guidelines 204(1)-204(n). The overall quality score 220 and the quality score 210(1)-210(n) for each of the plurality of definition guidelines can be displayed via a graphical user interface, see for example FIGS. 8 and 9. The overall quality score 220 can be calculated based on a weighted average score of the individual guideline scores 210(1)-210(n). The weights for the individual guideline scores can be derived as part of the process for preparing machine learning training data as further described below with respect to FIG. 10.

Figure 3:
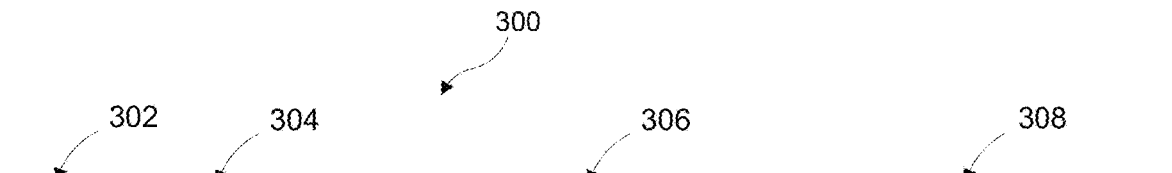
FIG. 3 is a table including representative definition guidelines and corresponding feature inputs, models, and rules according to some implementations of the present technology.

FIG. 3 shows a table 300 including representative definition guidelines 302 and corresponding feature inputs 304, ML models 306, and rules 308 according to some implementations of the present technology. Some of the guidelines 302 (e.g., Circular) include multiple feature inputs 304 which are fed into a ML model 306 and a set of rules 308. Other guidelines 302 (e.g., Conciseness) include feature inputs 304 which are evaluated only by a set of rules 308 and no ML model 306. Further, some guidelines 302 (e.g., Examples) only rely on a set of rules 308 for evaluating a definition. Still further, some guidelines 302 (e.g., Intensional) include feature inputs 304 and an ML model 306 but no rules 308. The guidelines described herein should not be construed as limiting and many other suitable quantifiable definition guidelines can be used.

Machine learning results are probabilistic in nature and are based on having enough examples in a training set from which the model can learn. In some cases, the training data may not contain enough examples of certain clear deterministic cases or certain corner cases for a machine learning model to effectively learn to identify them. The rules 308 can be used to catch these corner cases. For example, if the definition equals the term itself (e.g., "A cat is a cat."), it is not necessary to rely on machine learning to determine that the definition is circular.

FIG. 4 is a graphic illustration of representative steps for deriving a feature input, specifically a Part of Speech (POS) Sequence input 400, according to some implementations of the present technology. At step 402, the definition for a "Cat" is tokenized. Next at step 404, the parts of speech (e.g., Nouns, verbs, determiners, etc.) are tagged. At step 406, each word in the definition is replaced by a numeric value based on the part of speech. Finally, at step 408, the sequence is padded to a standard length (e.g., 10 values). In summary, "A cat is a feline" becomes [0.12, 0.11, 0.08, 0.12, 0.11, 0.45, 0.45, 0.45, 0.45, 0.45].

FIG. 5 is a graphic illustration of representative steps for deriving another feature input, specifically a Part of Speech (POS) Bag of Words (BOW) percent input 500, according to some implementations of the present technology. This feature input can also be referred to as a Bag of Parts of Speech. At step 502, the parts of speech in the definition are summed. At step 504, the percentage of each part of speech is calculated based on the number of words in the definition. In summary, "A cat is a feline" becomes [0.4, 0.4, 0.2, 0.0, . . . ].

Figure 6:
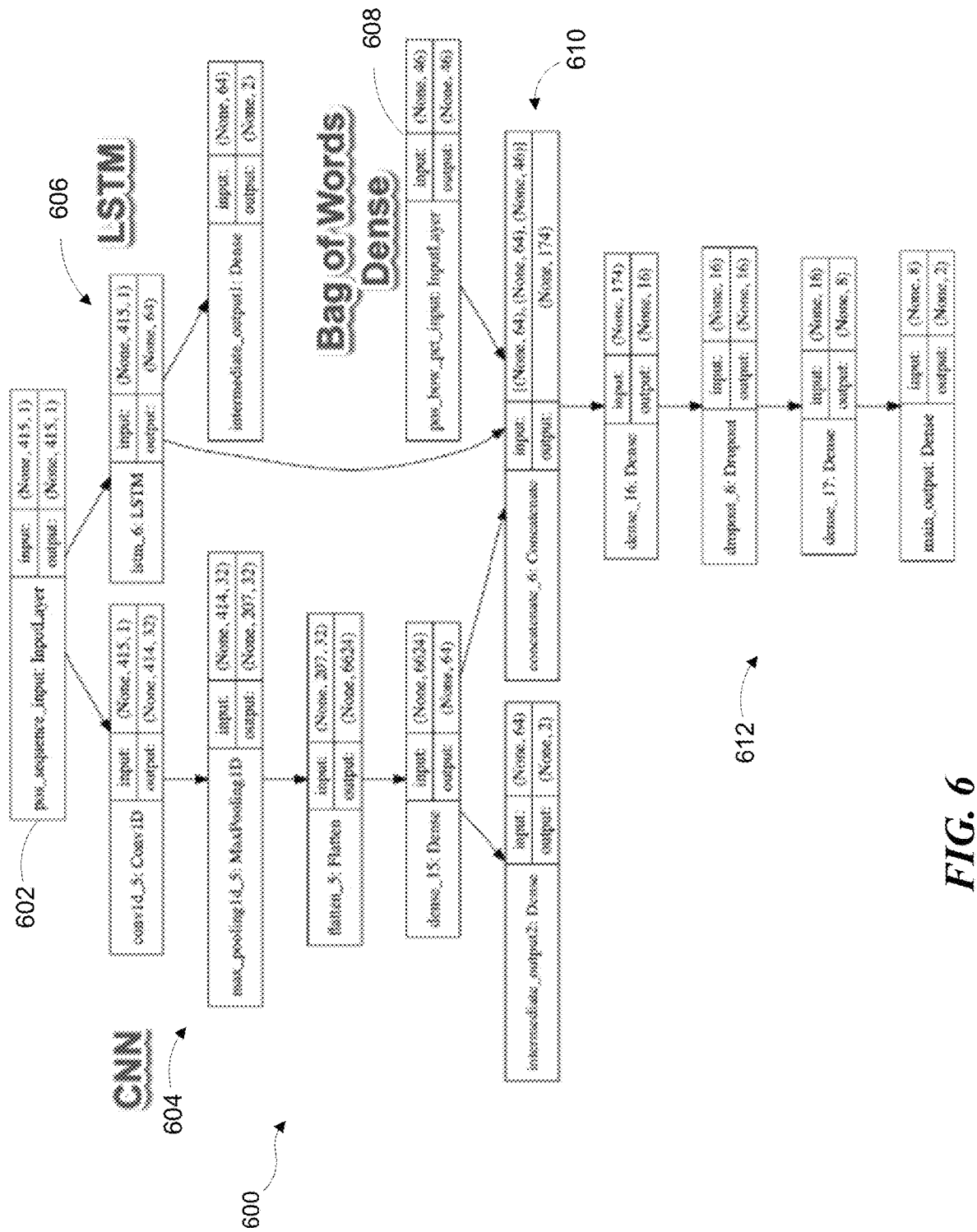
FIG. 6 is a flow diagram illustrating a representative definition guideline model according to some implementations of the present technology.

FIG. 6 is a flow diagram illustrating a representative definition guideline machine learning model 600 according to some implementations of the present technology. The machine learning model 600, referred to as a three-in-one model, corresponds to the Structure guideline (see FIG. 3) and includes a convolutional neural network (CNN) 604 and a Long short-term memory (LSTM) 606. The part of speech feature input 602 (e.g., FIG. 4) is fed into the CNN 604 and the LSTM 606. The output of the CNN 604 and the output of the LSTM 606 are concatenated with the part of speech bag of words input 608 (e.g., FIG. 5) to create a concatenated input 610. The concatenated input 610 is fed into a subsequent neural network (NN) 612 to output the final Structure guideline quality score.

Figure 7:
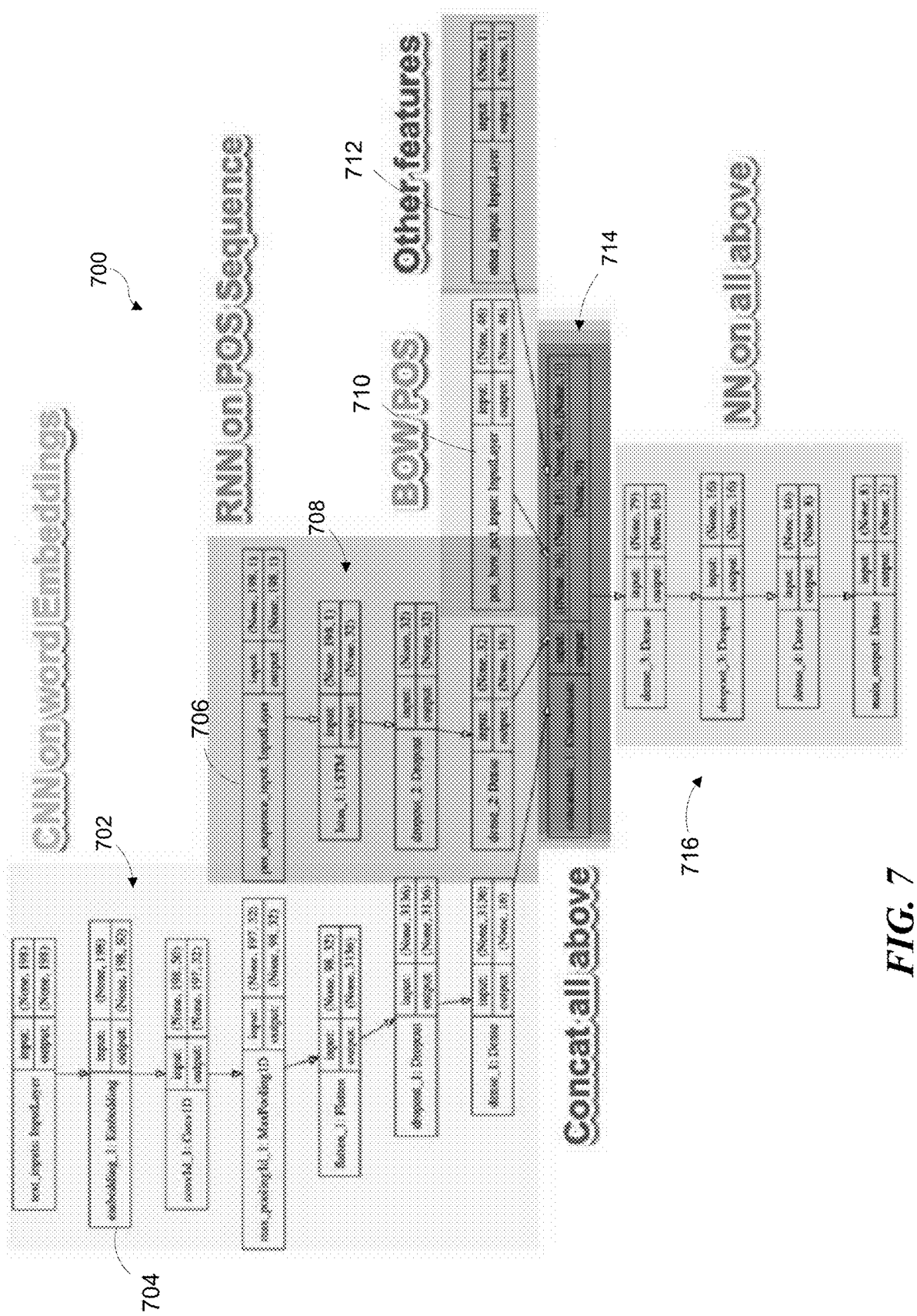
FIG. 7 is a flow diagram illustrating another representative definition guideline model according to some implementations of the present technology.

FIG. 7 is a flow diagram illustrating another representative definition guideline machine learning model 700 according to some implementations of the present technology. The machine learning model 700, referred to as a four-in-one model, corresponds to the Sub-definition guideline (see FIG. 3) and includes a convolutional neural network (CNN) 702 and a Recurrent neural network (RNN) 708. A text input word embedding 704 is fed into the CNN 702 and the part of speech feature input 706 (e.g., FIG. 4) is fed into the RNN 708. The output of the CNN 704 and the output of the RNN 708 are concatenated with the part of speech bag of words input 710 (e.g., FIG. 5) and other feature input(s) 712 to create a concatenated input 714. The concatenated input 714 is fed into a subsequent neural network (NN) 716 to output the final Sub-definition guideline quality score.

FIG. 8 is a representative graphical user interface 800 for manually inputting terms and definitions for quality assessment according to some implementations of the present technology. The interface 800 can include a term input field 802 and a corresponding definition input field 804. The system runs a definition quality assessment as described herein and displays a quality score 806 for each definition guideline and an overall quality score 810. In some embodiments, a graphical indicator 808, such as an icon or emoji, can be displayed to indicate if the scores are good or bad (e.g., smiley face and frowning face). In this example, the definition 804 of the term "cat" 802 appears to be a good definition with a high overall score 810 and good scores 806 for each guideline.

FIG. 9 shows another definition for the term "cat" 802. In this example, the definition 804 does not score as well as the previous example. This definition has low scores 806 for Structure, Circular, and Conciseness. In some embodiments, the system displays a "hint" 812 when the score 806 for a guideline falls below a selected threshold. In some embodiments, if the overall quality score 810 is less than a selected threshold score, the system recommends a transformation of the definition. The system can then receive the transformed version of the definition and assess the quality of the transformed version of the definition to help verify that the definition is improved. The interface 800 can also include a feedback field 814 to receive feedback for one or more of the displayed quality scores 806 and input the received user feedback into a retraining process associated with the machine learning model corresponding to each of the one or more quality scores 806.

Figure 10:
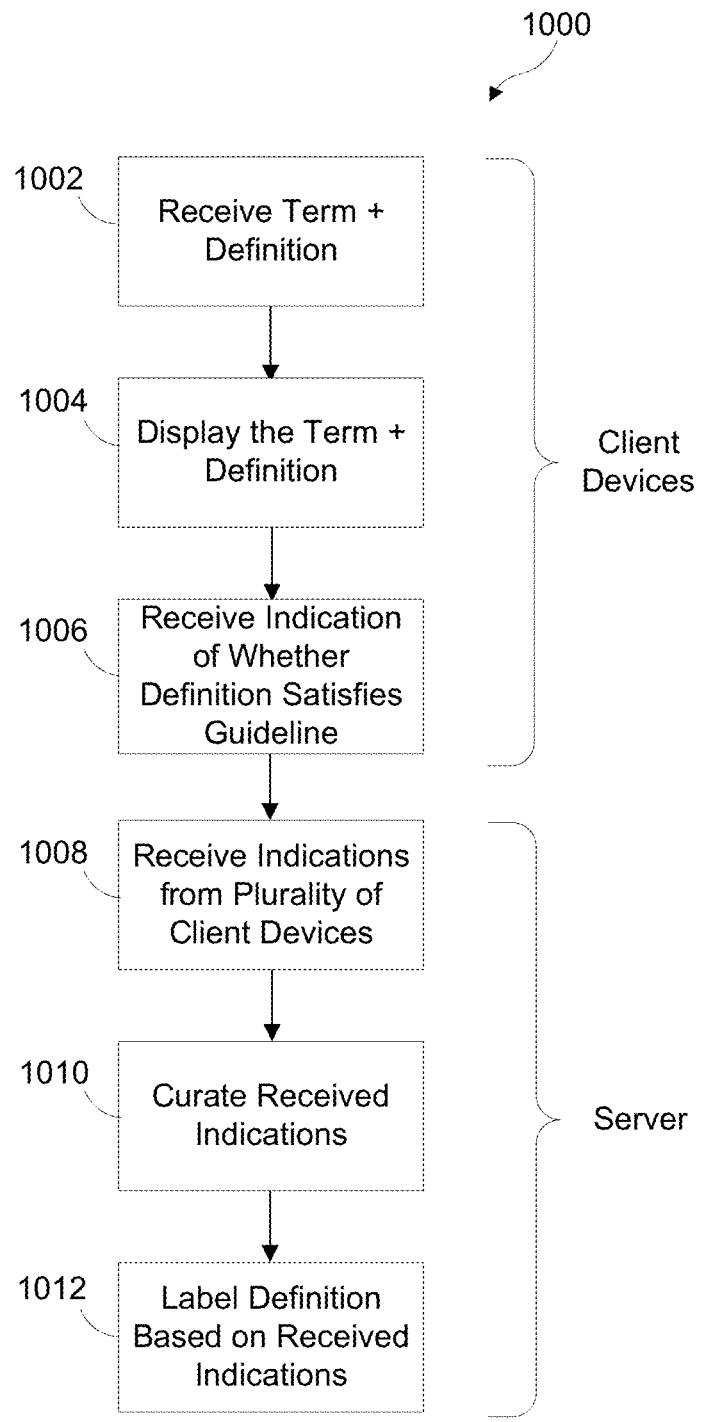
FIG. 10 is a flow diagram illustrating a system for preparing machine learning training data for use in evaluation of definition quality according to some implementations of the present technology.

The definition quality assessment technology described above includes machine learning models that must be trained using labeled definition data. FIG. 10 is a flow diagram illustrating a system 1000 for preparing machine learning training data for use in evaluation of definition quality according to some implementations of the present technology. In some embodiments, the system can include a server and one or more client devices. The server can send multiple definitions to multiple user's client devices to collect data for each definition with respect to the definition guidelines. Each client device receives a term and a corresponding definition from the server at 1002. In some embodiments, an initial set of definitions can be collected from several open resources as well as manually fabricated definitions and/or altered existing definitions.

The client device displays the term and its corresponding definition at step 1004. A user (e.g., a reviewer) reads the definition and evaluates the definition with respect to various definition quality guidelines. The client device receives indications from the user as to whether the definition satisfies each of the definition quality guidelines at step 1006. In some embodiments, the indications are in the form of a binary affirmative or negative response. In others, the indications can be numeric values on a scale of 1 to 10, for example. In further embodiments, the indications can be: very bad, bad, average, good, and very good (e.g., on a scale of 1 to 5). In some embodiments, the reviewers are allowed to comment on why the definition was good or bad or even provide an edited (e.g., better) version of the definition.

As noted above with respect to FIG. 2, the overall quality score 220 can be calculated based on a weighted average score of the individual guideline scores 210(1)-210(n). In some embodiments, the weights can be derived through a manual labeling exercise where reviewers provide an overall score separate from the scores for each individual guideline. From these overall scores the importance (i.e., weight) of each individual guideline score on the overall score can be derived. For example, if reviewers are presented with ten definitions with obvious instances of examples in them and the reviewers consistently rated the definitions as "bad" under the Examples guideline but gave the definitions a good overall score, the Example guideline should have a low relative weighting. In contrast, the Structure guideline has a higher relative weighting.

The server can receive indication data from multiple client devices at step 1008 and compile that data in order to label each definition as satisfying each of the definition quality guidelines or not based on the received indications. In some embodiments, the indications received from the client devices are curated prior to labeling each definition. For example, the indication data received back from the reviewers can be initially curated by looking for strong consensus (scores on either one of the more extreme sides of the scale) of at least three reviewers on whether the definitions met or did not meet a particular guideline. Definitions with a lot of disagreement among the ratings are reviewed for potential reasons why there might have been disagreement. When such reasons can be determined (for example certain reviewers interpreted a guideline differently from what was intended) the feedback can be manually corrected. In other cases where the difference of opinion was due to the definition itself being very borderline (not good or bad), or the scores were not strong enough (mostly average scores), the definition is removed from the dataset, since it may hinder the machine learning model to learn efficiently. Although the reviewers may be allowed to score definitions on a scale, as part of the curation process these scores are converted into a binary response (good versus bad), removing cases where no consensus could be found or where opinions hovered around the middle of the scale. In some cases, the removal of data creates a case of too little data left and for those areas additional cases can be manually labeled to help ensure a balanced training set.

FIG. 11 shows a table including representative machine learning training data 1100 according to some implementations of the present technology. The training data 1100 is curated training data for the Circular definition quality guideline. The data includes index values 1102, terms 1104, a corresponding definition 1106 for each term, and a label 1108 for each definition. Terms can have more than one definition e.g., "employee." In this embodiment, the terms are labeled as "good" or "bad."

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 12:
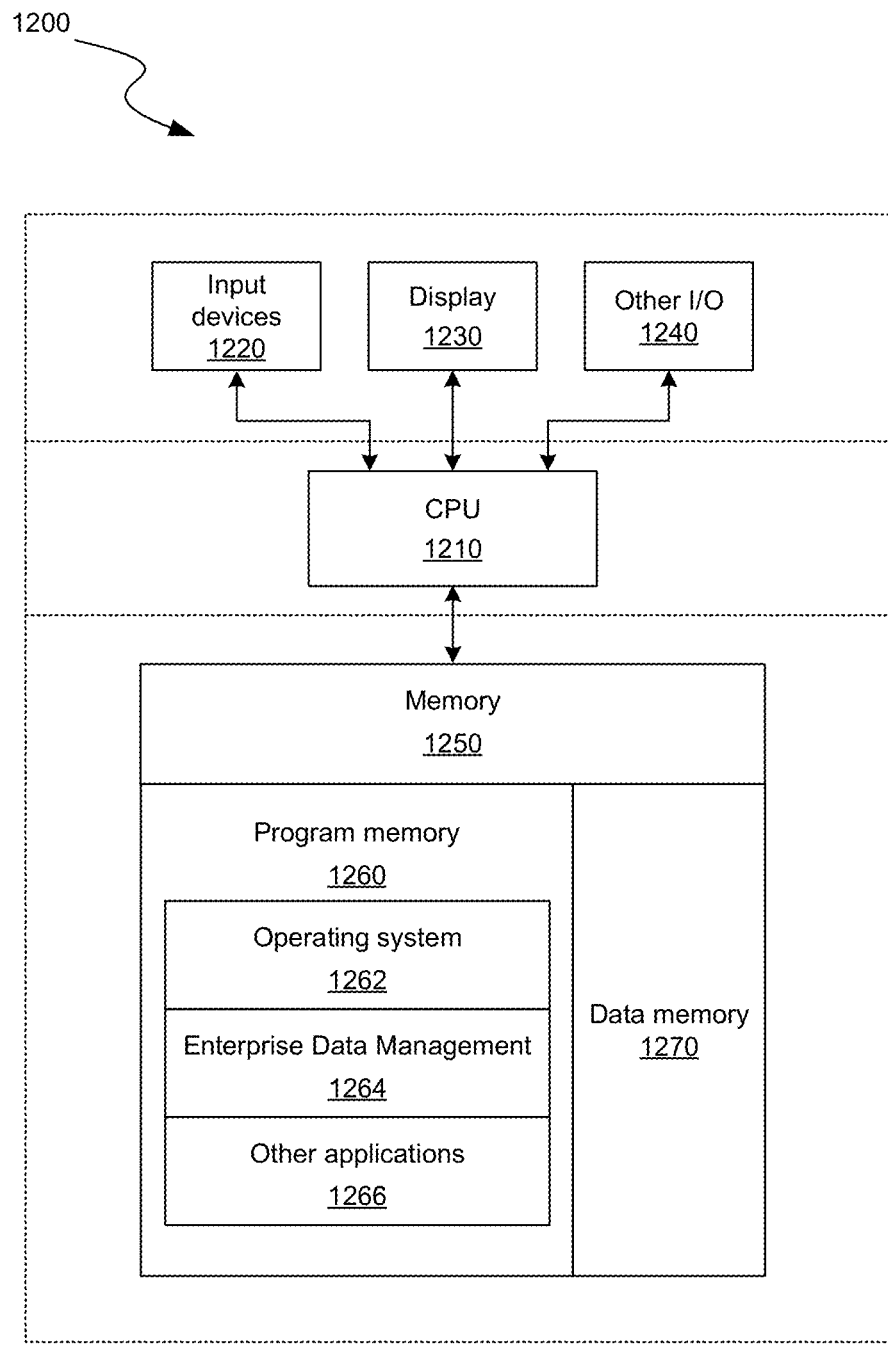
FIG. 12 is a block diagram illustrating an overview of devices on which some implementations can operate.

Several implementations are discussed below in more detail in reference to the figures. FIG. 12 is a block diagram illustrating an overview of devices on which some implementations of the disclosed technology can operate. Device 1200 can include one or more input devices 1220 that provide input to the CPU (processor) 1210, notifying it of actions. The actions are typically mediated by a hardware controller that interprets the signals received from the input device and communicates the information to the CPU 1210 using a communication protocol. Input devices 1220 include, for example, a mouse, a keyboard, a touchscreen, an infrared sensor, a touchpad, a wearable input device, a camera- or image-based input device, a microphone, or other user input devices.

CPU 1210 can be a single processing unit or multiple processing units in a device or distributed across multiple devices. CPU 1210 can be coupled to other hardware devices, for example, with the use of a bus, such as a PCI bus or SCSI bus. The CPU 1210 can communicate with a hardware controller for devices, such as for a display 1230. Display 1230 can be used to display text and graphics. In some examples, display 1230 provides graphical and textual visual feedback to a user. In some implementations, display 1230 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1240 can also be coupled to the processor, such as a network card, video card, audio card, USB, FireWire or other external device, camera, printer, speakers, CD-ROM drive, DVD drive, disk drive, or Blu-Ray device.

In some implementations, the device 1200 also includes a communication device capable of communicating wirelessly or wire-based with a network node. The communication device can communicate with another device or a server through a network using, for example, TCP/IP protocols. Device 1200 can utilize the communication device to distribute operations across multiple network devices.

The CPU 1210 can have access to a memory 1250. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1250 can include program memory 1260 that stores programs and software, such as an operating system 1262, an enterprise data management system 1264, and other application programs 1266. Memory 1250 can also include data memory 1270 that can include database information, etc., which can be provided to the program memory 1260 or any element of the device 1200.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 13:
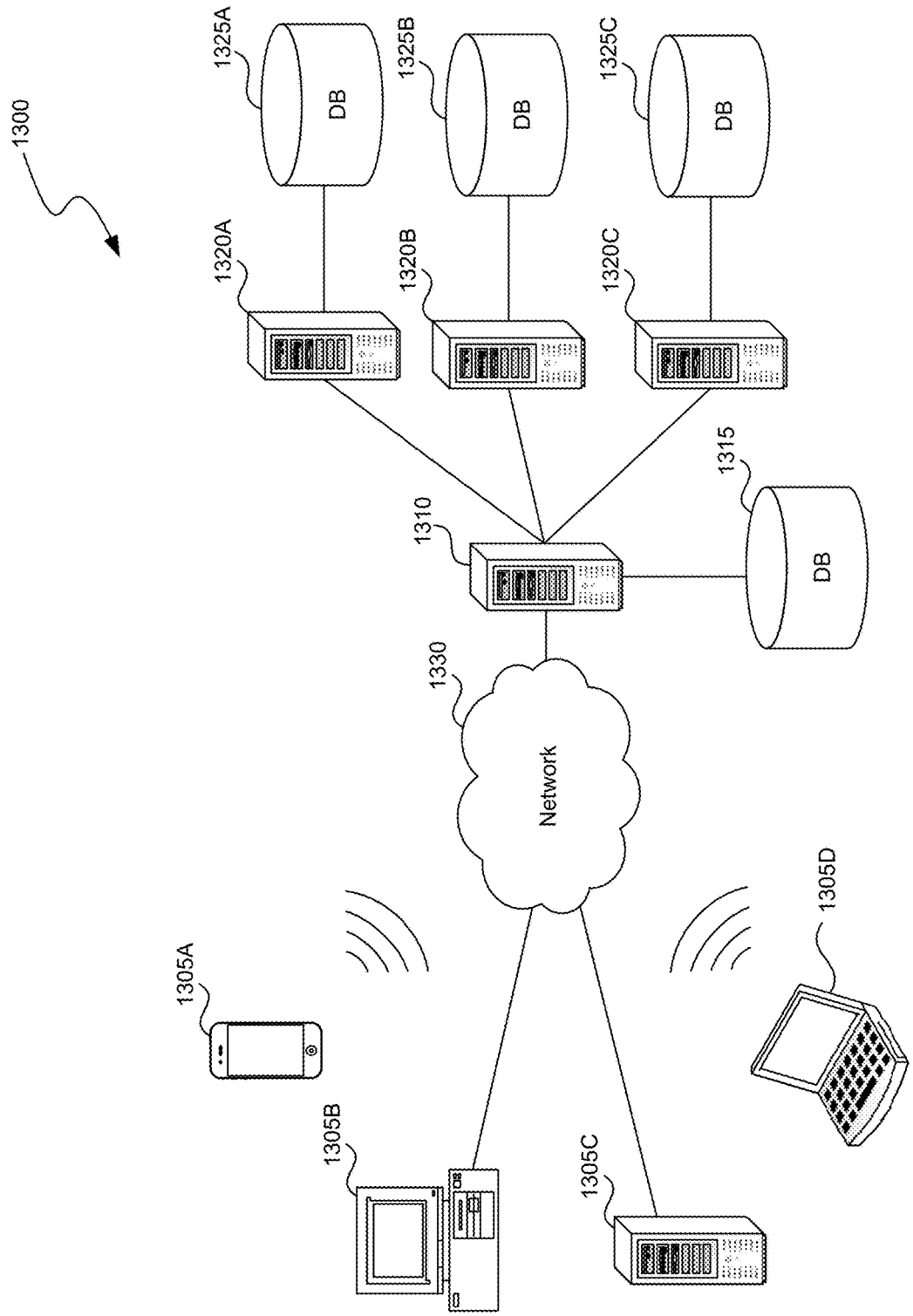
FIG. 13 is a block diagram illustrating an overview of an environment in which some implementations can operate.

FIG. 13 is a block diagram illustrating an overview of an environment 1300 in which some implementations of the disclosed technology can operate. Environment 1300 can include one or more client computing devices 1305A-D, examples of which can include device 1200. Client computing devices 1305 can operate in a networked environment using logical connections through network 1330 to one or more remote computers, such as a server computing device 1310.

In some implementations, server computing device 1310 can be an edge server that receives client requests and coordinates fulfillment of those requests through other servers, such as servers 1320A-C. Server computing devices 1310 and 1320 can comprise computing systems, such as device 1200. Though each server computing device 1310 and 1320 is displayed logically as a single server, server computing devices can each be a distributed computing environment encompassing multiple computing devices located at the same or at geographically disparate physical locations. In some implementations, each server computing device 1320 corresponds to a group of servers.

Client computing devices 1305 and server computing devices 1310 and 1320 can each act as a server or client to other server/client devices. Server 1310 can connect to a database 1315. Servers 1320A-C can each connect to a corresponding database 1325A-C. As discussed above, each server 1320 can correspond to a group of servers, and each of these servers can share a database or can have their own database. Databases 1315 and 1325 can warehouse (e.g., store) information. Though databases 1315 and 1325 are displayed logically as single units, databases 1315 and 1325 can each be a distributed computing environment encompassing multiple computing devices, can be located within their corresponding server, or can be located at the same or at geographically disparate physical locations.

Network 1330 can be a local area network (LAN) or a wide area network (WAN), but can also be other wired or wireless networks. Network 1330 may be the Internet or some other public or private network. Client computing devices 1305 can be connected to network 1330 through a network interface, such as by wired or wireless communication. While the connections between server 1310 and servers 1320 are shown as separate connections, these connections can be any kind of local, wide area, wired, or wireless network, including network 1330 or a separate public or private network.

Figure 14:
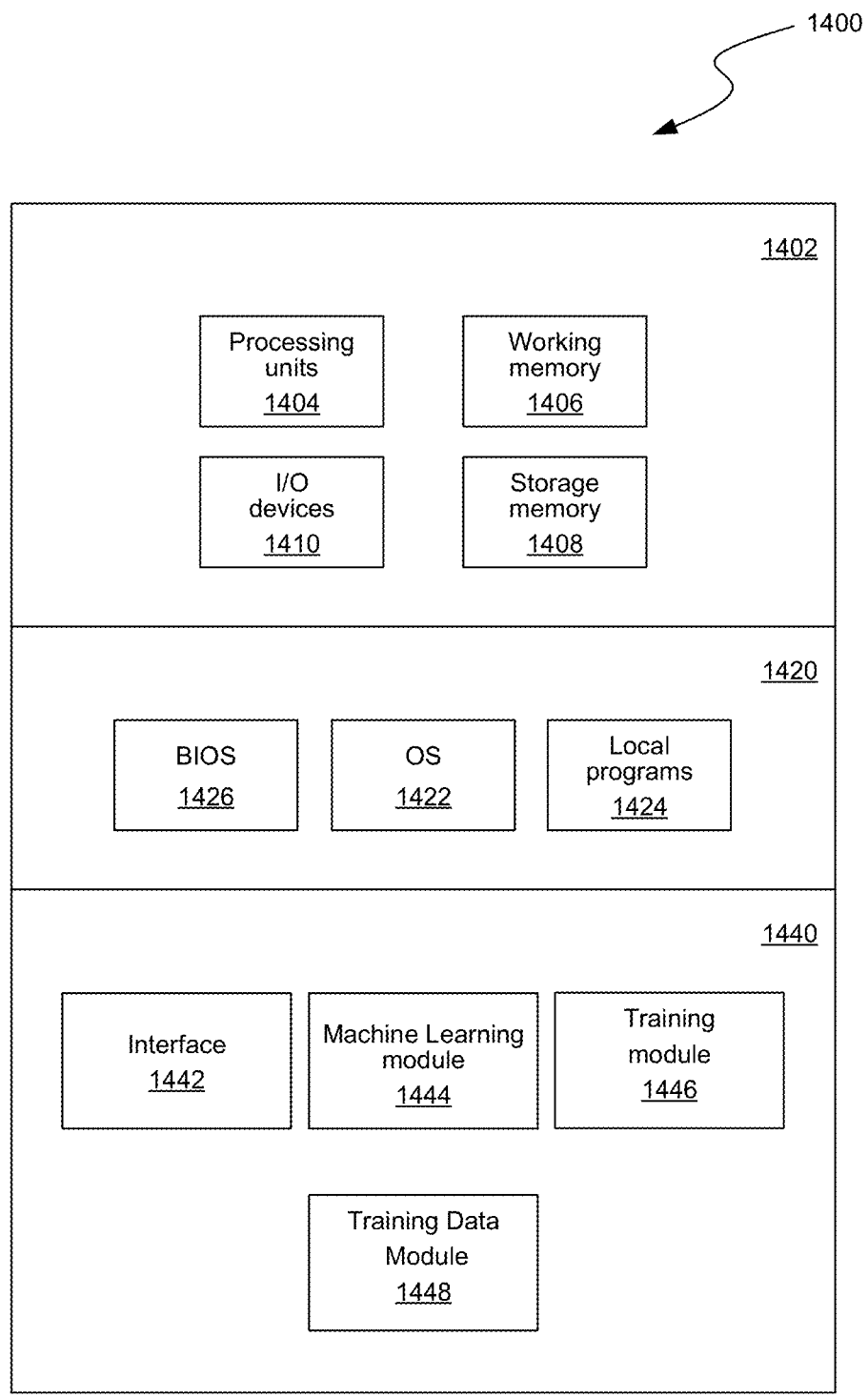
FIG. 14 is a block diagram illustrating components which, in some implementations, can be used in a system employing the disclosed technology.

FIG. 14 is a block diagram illustrating components 1400 which, in some implementations, can be used in a system employing the disclosed technology. The components 1400 include hardware 1402, general software 1420, and specialized components 1440. As discussed above, a system implementing the disclosed technology can use various hardware, including processing units 1404 (e.g., CPUs, GPUs, APUs, etc.), working memory 1406, storage memory 1408, and input and output devices 1410. Components 1400 can be implemented in a client computing device such as client computing devices 1305 or on a server computing device, such as server computing device 1310 or 1320.

General software 1420 can include various applications, including an operating system 1422, local programs 1424, and a basic input output system (BIOS) 1426. Specialized components 1440 can be subcomponents of a general software application 1420, such as local programs 1424. Specialized components 1440 can include Machine Learning Module 1444, Training module 1446, Training Data module 1448, and components that can be used for transferring data and controlling the specialized components, such as interface 1442. In some implementations, components 1400 can be in a computing system that is distributed across multiple computing devices or can be an interface to a server-based application executing one or more of specialized components 1440.

Those skilled in the art will appreciate that the components illustrated in FIGS. 12-14 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Although specific embodiments have been shown by way of example in the drawings and are described in detail above, other embodiments are possible. For example, in some embodiments, an enterprise data management system with definition quality assessment capabilities for automatically assessing the quality of definitions for terms stored in the enterprise data management system can include at least one memory device storing instructions for causing at least one processor to receive a term and receive a definition corresponding to the term. The processor can also assess the quality of the definition, including for each of a plurality of quantifiable definition guidelines: deriving at least one feature input based on at least the definition, feeding the at least one feature input into a machine learning model corresponding to the definition guideline, and receiving a quality score for the definition guideline from the corresponding machine learning model. The processor calculates an overall quality score based on the quality score for each of the plurality of definition guidelines and displays the overall quality score and the quality score for each of the plurality of definition guidelines. If the overall quality score is less than a selected threshold score, the processor recommends a transformation of the definition.

In some embodiments, the system further comprises instructions to receive a transformed version of the definition and assess the quality of the transformed version of the definition. In some embodiments, one of the plurality of definition guidelines is a structure guideline and wherein evaluating the definition with respect to the structure guideline comprises deriving a part of speech feature input and a part of speech bag of words input. In some embodiments, the machine learning model corresponding to the structure guideline includes a CNN and an LSTM, and wherein feeding the at least on feature input into the machine learning model comprises: feeding the part of speech feature input into the CNN and the LSTM; concatenating an output of the CNN and an output of the LSTM with the part of speech bag of words input to create a concatenated input; and feeding the concatenated input into a subsequent NN. In some embodiments, the system further comprises instructions to receive user feedback for one or more of the displayed quality scores and input the received user feedback into a retraining process associated with the machine learning model corresponding to each of the one or more quality scores. In some embodiments, evaluating at least one of the plurality of definition guidelines includes deriving at least one feature input based on the definition and the term. In some embodiments, evaluating at least one of the plurality of definition guidelines includes deriving a number of words feature input and a number of sentences feature input. In some embodiments, deriving the at least one feature input based on at least the definition includes calculating a feature metric. In some embodiments, the system further comprises instructions to train each machine learning model corresponding to each of the definition guidelines with a set of definitions each labeled as to whether it satisfies the corresponding definition guideline.

In another representative embodiment, an enterprise data management system with definition quality assessment capabilities for automatically assessing the quality of definitions for terms stored in the enterprise data management system can include at least one memory device storing instructions for causing at least one processor to receive a term and receive a plurality of definitions corresponding to the term. The processor can also assess the quality of each definition, including for each of a plurality of quantifiable definition guidelines: deriving at least one feature input based on the definition, feeding the at least one feature input into a machine learning model corresponding to the definition guideline, and receiving a quality score for the definition guideline from the corresponding machine learning model. The processor can also calculate an overall quality score for each definition based on the quality score for each of the plurality of definition guidelines, display the overall quality score for each definition, and select the definition having the highest overall quality score as the only definition for the term.

In a further representative embodiment, an enterprise data management system with definition quality assessment capabilities for automatically assessing the quality of definitions for terms stored in the enterprise data management system can include at least one memory device storing instructions for causing at least one processor to receive a term and receive a definition corresponding to the term. The processor can assess the quality of the definition, including for each of a plurality of quantifiable definition guidelines: deriving at least one feature input based on at least the definition, feeding the at least one feature input into a machine learning model corresponding to the definition guideline, and receiving a quality score for the definition guideline from the corresponding machine learning model. The processor can also calculate an overall quality score based on the quality score for each of the plurality of definition guidelines and display the overall quality score and the quality score for each of the plurality of definition guidelines. Each machine learning model corresponding to each of the definition guidelines is trained with a set of definitions each labeled as to whether it satisfies the corresponding definition guideline.

In a representative embodiment, a system for preparing machine learning training data for use in evaluation of term definition quality can include a server having at least one server processor and at least one server memory for storing a plurality of terms with corresponding definitions and a plurality of client devices each having at least one client memory device storing instructions for causing at least one client processor to receive at least one of the plurality of terms and its corresponding definition from the server and display the term and its corresponding definition. The client processor can receive an indication of whether the definition satisfies one or more definition quality guidelines. The at least one server memory includes instructions for causing the at least one server processor to receive the indications from the plurality of client devices and label each definition as satisfying each of the definition quality guidelines or not based on the received indications.

In some embodiments, the indications are in the form of a binary affirmative or negative response. In some embodiments, the server labels a definition as having satisfied a definition quality guideline only if at least three of the indications for that definition quality guideline are in the affirmative. In some embodiments, the indications are on a scale and wherein the at least one server memory includes instructions for causing the at least one server processor to convert the scaled indications into a binary affirmative or negative response. In some embodiments, the indications received from the plurality of client devices are curated prior to labeling each definition by removing indications that do not match selected criteria. In some embodiments, the at least one client memory includes instructions for causing the at least one client processor to receive an overall score for the definition and wherein the at least one server memory includes instructions for causing the at least one server processor to derive a weight for each individual guideline based on the overall score. In some embodiments, the at least one server memory includes instructions for causing the at least one server processor to train a machine learning model corresponding to each of the definition quality guidelines with a set of labeled definitions corresponding to each machine learning model's definition quality guideline.

In another representative embodiment, an enterprise data management system with definition quality assessment capabilities for automatically assessing the quality of definitions for terms stored in the enterprise data management system can include a server having at least one server processor and at least one server memory for storing a plurality of terms with corresponding definitions and a plurality of client devices each having at least one client memory device storing instructions for causing at least one client processor to receive at least one of the plurality of terms and its corresponding definition from the server and display the term and its corresponding definition. The client processor can also receive an indication of whether the definition satisfies one or more definition quality guidelines. The at least one server memory includes instructions for causing the at least one server processor to receive the indications from the plurality of client devices and label each definition as satisfying each of the definition quality guidelines or not based on the received indications, and train a machine learning model corresponding to each of the definition quality guidelines with a set of labeled definitions corresponding to each machine learning model's definition quality guideline.

In a further representative embodiment, a method for preparing machine learning training data for use in evaluation of term definition quality can include receiving at least one of a plurality of terms and a corresponding definition, displaying the term and its corresponding definition, receiving an indication of whether the definition satisfies one or more definition quality guidelines, and labeling each definition as satisfying each of the definition quality guidelines or not based on the received indications.

In some embodiments, the indications are in the form of a binary affirmative or negative response. In some embodiments, a definition is labeled as having satisfied a definition quality guideline only if at least three of the indications for that definition quality guideline are in the affirmative. In some embodiments, the indications are on a scale and further comprising converting the scaled indications into a binary affirmative or negative response. In some embodiments, the indications received from the plurality of client devices are curated prior to labeling each definition by removing indications that do not match selected criteria. In some embodiments, the method further comprises receiving an overall score for the definition and deriving a weight for each individual guideline based on the overall score. In some embodiments, the method further comprises training a machine learning model corresponding to each of the definition quality guidelines with a set of labeled definitions corresponding to each machine learning model's definition quality guideline.

The following examples provide additional embodiments of the present technology.

EXAMPLES

1. A system for preparing machine learning training data for use in evaluation of term definition quality, the system comprising:
   a server having at least one server processor and at least one server memory for storing a plurality of terms with corresponding definitions;
   a plurality of client devices each having at least one client memory device storing instructions for causing at least one client processor to:
      receive at least one of the plurality of terms and its corresponding definition from the server;
      display the term and its corresponding definition; and
      receive an indication of whether the definition satisfies one or more definition quality guidelines;
   wherein the at least one server memory includes instructions for causing the at least one server processor to receive the indications from the plurality of client devices and label each definition as satisfying each of the definition quality guidelines or not based on the received indications.

2. The system of example 1, wherein the indications are in the form of a binary affirmative or negative response.

3. The system of example 1 or 2, wherein the server labels a definition as having satisfied a definition quality guideline only if at least three of the indications for that definition quality guideline are in the affirmative.

4. The system of any one of examples 1 to 3, wherein the indications are on a scale and wherein the at least one server memory includes instructions for causing the at least one server processor to convert the scaled indications into a binary affirmative or negative response.

5. The system of any one of examples 1 to 4, wherein the indications received from the plurality of client devices are curated prior to labeling each definition by removing indications that do not match selected criteria.

6. The system of any one of examples 1 to 5, wherein the at least one client memory includes instructions for causing the at least one client processor to receive an overall score for the definition and wherein the at least one server memory includes instructions for causing the at least one server processor to derive a weight for each individual guideline based on the overall score.

7. The system of any one of examples 1 to 6, wherein the at least one server memory includes instructions for causing the at least one server processor to train a machine learning model corresponding to each of the definition quality guidelines with a set of labeled definitions corresponding to each machine learning model's definition quality guideline.

8. An enterprise data management system with definition quality assessment capabilities for automatically assessing the quality of definitions for terms stored in the enterprise data management system, the system comprising:
   a server having at least one server processor and at least one server memory for storing a plurality of terms with corresponding definitions;
   a plurality of client devices each having at least one client memory device storing instructions for causing at least one client processor to:
      receive at least one of the plurality of terms and its corresponding definition from the server;
      display the term and its corresponding definition; and
      receive an indication of whether the definition satisfies one or more definition quality guidelines;
   wherein the at least one server memory includes instructions for causing the at least one server processor to:

receive the indications from the plurality of client devices and label each definition as satisfying each of the definition quality guidelines or not based on the received indications, and train a machine learning model corresponding to each of the definition quality guidelines with a set of labeled definitions corresponding to each machine learning model's definition quality guideline.

9. The system of example 8, wherein the indications are in the form of a binary affirmative or negative response.

10. The system of example 8 or 9, wherein the server labels a definition as having satisfied a definition quality guideline only if at least three of the indications for that definition quality guideline are in the affirmative.

11. The system of any one of examples 8 to 10, wherein the indications are on a scale and wherein the at least one server memory includes instructions for causing the at least one server processor to convert the scaled indications into a binary affirmative or negative response.

12. The system of any one of examples 8 to 11, wherein the indications received from the plurality of client devices are curated prior to labeling each definition by removing indications that do not match selected criteria.

13. The system of any one of examples 8 to 12, wherein the at least one client memory includes instructions for causing the at least one client processor to receive an overall score for the definition and wherein the at least one server memory includes instructions for causing the at least one server processor to derive a weight for each individual guideline based on the overall score.

14. A method for preparing machine learning training data for use in evaluation of term definition quality, the method comprising:

receiving at least one of a plurality of terms and a corresponding definition;

displaying the term and its corresponding definition;

receiving an indication of whether the definition satisfies one or more definition quality guidelines; and labeling each definition as satisfying each of the definition quality guidelines or not based on the received indications.

15. The method of example 14, wherein the indications are in the form of a binary affirmative or negative response.

16. The method of example 14 or 15, wherein a definition is labeled as having satisfied a definition quality guideline only if at least three of the indications for that definition quality guideline are in the affirmative.

17. The method of any one of examples 14 to 16, wherein the indications are on a scale and further comprising converting the scaled indications into a binary affirmative or negative response.

18. The method of any one of examples 14 to 17, wherein the indications received from the plurality of client devices are curated prior to labeling each definition by removing indications that do not match selected criteria.

19. The method of any one of examples 14 to 18, further comprising receiving an overall score for the definition and deriving a weight for each individual guideline based on the overall score.

20. The method of any one of examples 14 to 19, further comprising training a machine learning model corresponding to each of the definition quality guidelines with a set of labeled definitions corresponding to each machine learning model's definition quality guideline.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A system for preparing machine learning training data for use in evaluation of term definition quality, the system comprising:

a server having at least one server processor and at least one server memory for storing a plurality of terms with corresponding definitions;

a plurality of client devices each having at least one client memory device storing instructions for causing at least one client processor to:

receive at least one of the plurality of terms and its corresponding definition from the server;

display the term and its corresponding definition; and receive an indication of whether the definition satisfies multiple definition quality guidelines, wherein the multiple definition quality guidelines define a structure, conciseness, circularity, and understandability between the term and its corresponding definition;

wherein the at least one server memory includes instructions for causing the at least one server processor to:

receive the indications from the plurality of client devices and label each definition as satisfying each of the definition quality guidelines or not based on the received indications;
generate a set of labeled definitions based on the one or more definition quality guidelines;
derive a part of speech feature input from the definition; and
based on the term and its corresponding definition and the set of labeled definitions, train a machine learning model comprising a convolutional neural network (CNN) by feeding the part of speech feature input into the CNN.

2. The system of claim 1, wherein the indications are in the form of a binary affirmative or negative response.

3. The system of claim 2, wherein the server labels a definition as having satisfied a definition quality guideline only if at least three of the indications for that definition quality guideline are in the affirmative.

4. The system of claim 1, wherein the indications are on a scale and wherein the at least one server memory includes instructions for causing the at least one server processor to convert the scaled indications into a binary affirmative or negative response.

5. The system of claim 1, wherein the indications received from the plurality of client devices are curated prior to labeling each definition by removing indications that do not match selected criteria.

6. The system of claim 1, wherein the at least one client memory includes instructions for causing the at least one client processor to receive an overall score for the definition and wherein the at least one server memory includes instructions for causing the at least one server processor to derive a weight for each individual guideline based on the overall score.

7. A method for preparing machine learning training data for use in evaluation of term definition quality, the method comprising:
receiving at least one of a plurality of terms and a corresponding definition;
displaying the term and its corresponding definition;
receiving an indication of whether the definition satisfies multiple definition quality guidelines, wherein the multiple definition quality guidelines define a structure, conciseness, circularity, and understandability between the term and its corresponding definition;
labeling each definition as satisfying each of the definition quality guidelines or not based on the received indications;
generating a set of labeled definitions based on the labeling of each definition and based on the one or more definition quality guidelines;
deriving a part of speech feature input from the definition; and
based on the term and its corresponding definition and the set of labeled definitions, training a machine learning model comprising a convolutional neural network (CNN) by feeding the part of speech feature input into the CNN.

8. An enterprise data management system with definition quality assessment capabilities for automatically assessing the quality of definitions for terms stored in the enterprise data management system, the system comprising:
a server having at least one server processor and at least one server memory for storing a plurality of terms with corresponding definitions;
a plurality of client devices each having at least one client memory device storing instructions for causing at least one client processor to:
receive at least one of the plurality of terms and its corresponding definition from the server;
display the term and its corresponding definition; and
receive an indication of whether the definition satisfies multiple definition quality guidelines, wherein the multiple definition quality guidelines define a structure, conciseness, circularity, and understandability between the term and its corresponding definition;
wherein the at least one server memory includes instructions for causing the at least one server processor to:
receive the indications from the plurality of client devices and label each definition as satisfying each of the definition quality guidelines or not based on the received indications;
generate a set of labeled definitions based on the one or more definition quality guidelines;
derive a part of speech feature input from the definition; and
based on the term and its corresponding definition and the set of labeled definitions, train a machine learning model comprising a convolutional neural network (CNN) by feeding the part of speech feature input into the CNN.

9. The system of claim 8, wherein the indications are in the form of a binary affirmative or negative response.

10. The system of claim 9, wherein the server labels a definition as having satisfied a definition quality guideline only if at least three of the indications for that definition quality guideline are in the affirmative.

11. The system of claim 8, wherein the indications are on a scale and wherein the at least one server memory includes instructions for causing the at least one server processor to convert the scaled indications into a binary affirmative or negative response.

12. The system of claim 8, wherein the indications received from the plurality of client devices are curated prior to labeling each definition by removing indications that do not match selected criteria.

13. The system of claim 8, wherein the at least one client memory includes instructions for causing the at least one client processor to receive an overall score for the definition and wherein the at least one server memory includes instructions for causing the at least one server processor to derive a weight for each individual guideline based on the overall score.

14. The method of claim 7, wherein the machine learning model comprises a long short-term memory (LSTM), and wherein the machine learning model is trained by feeding the part of speech feature input into the LSTM.

15. The method of claim 7, wherein the indications are in the form of a binary affirmative or negative response.

16. The method of claim 15, wherein a definition is labeled as having satisfied a definition quality guideline only if at least three of the indications for that definition quality guideline are in the affirmative.

17. The method of claim 7, wherein the indications are on a scale and further comprising converting the scaled indications into a binary affirmative or negative response.

18. The method of claim 7, wherein the indications received from the plurality of client devices are curated prior to labeling each definition by removing indications that do not match selected criteria.

19. The method of claim 7, further comprising receiving an overall score for the definition and deriving a weight for each individual guideline based on the overall score.

\* \* \* \* \*